No. 758,231. PATENTED APR. 26, 1904.
S. B., C. G. & J. C. ABBOTT.
BROADCAST SEED PLANTER.
APPLICATION FILED JULY 30, 1903.
NO MODEL. 2 SHEETS—SHEET 1.
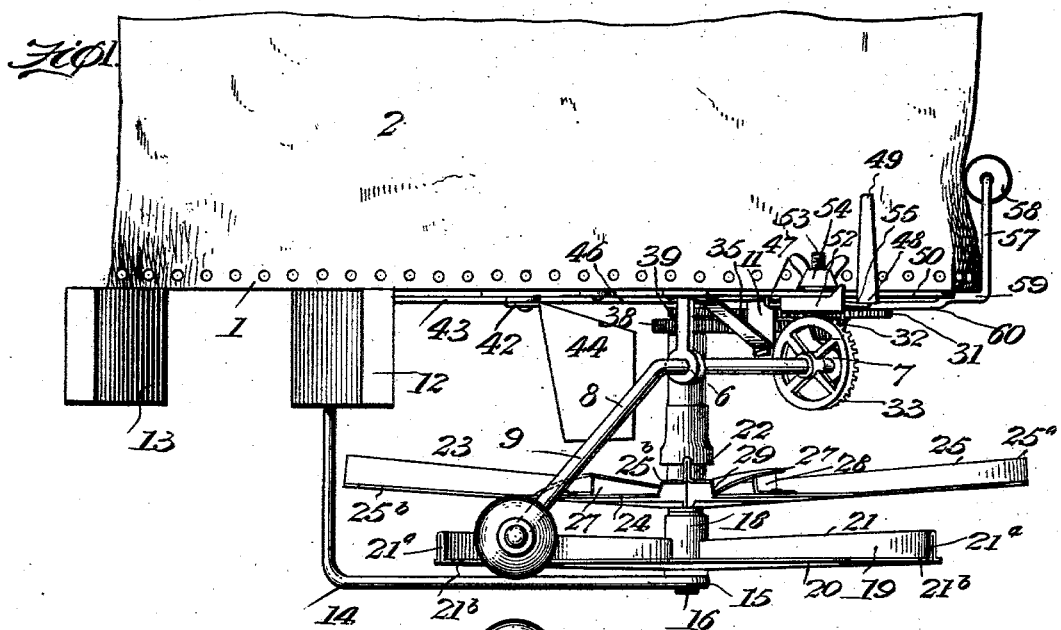
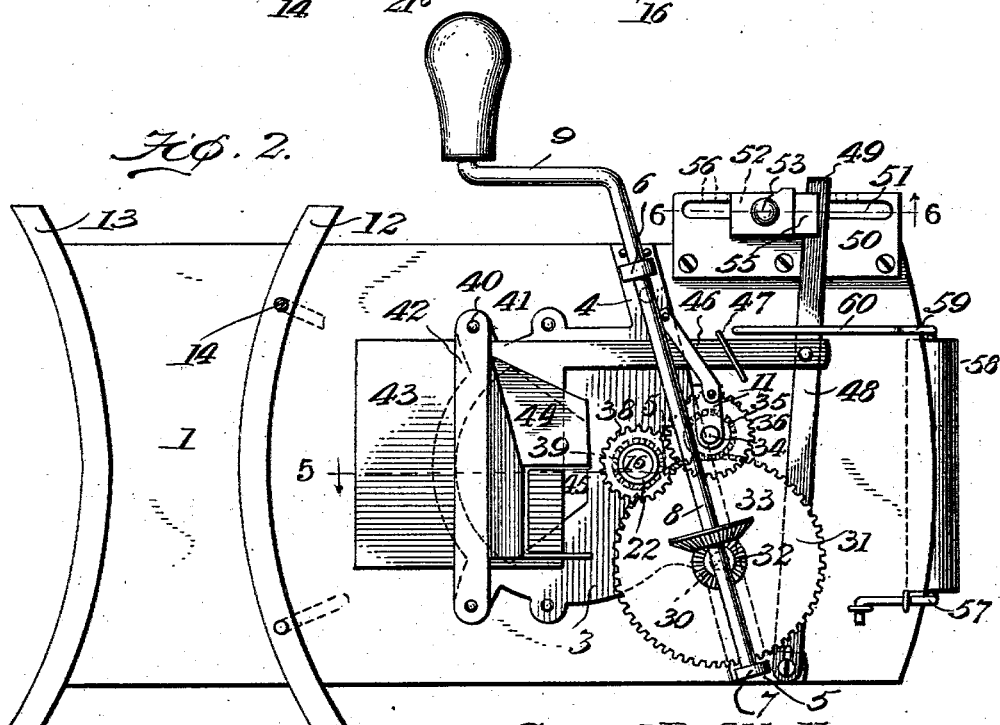
Samuel B. Abbott,
Curzon G. Abbott, and
James C. Abbott, Inventors
by C. A. Snow & Co.
Attorneys
Witnesses No. 758,231. PATENTED APR. 26, 1904.
S. B., C. G. & J. C. ABBOTT.
BROADCAST SEED PLANTER.
APPLICATION FILED JULY 30, 1903.
NO MODEL. 2 SHEETS—SHEET 2.
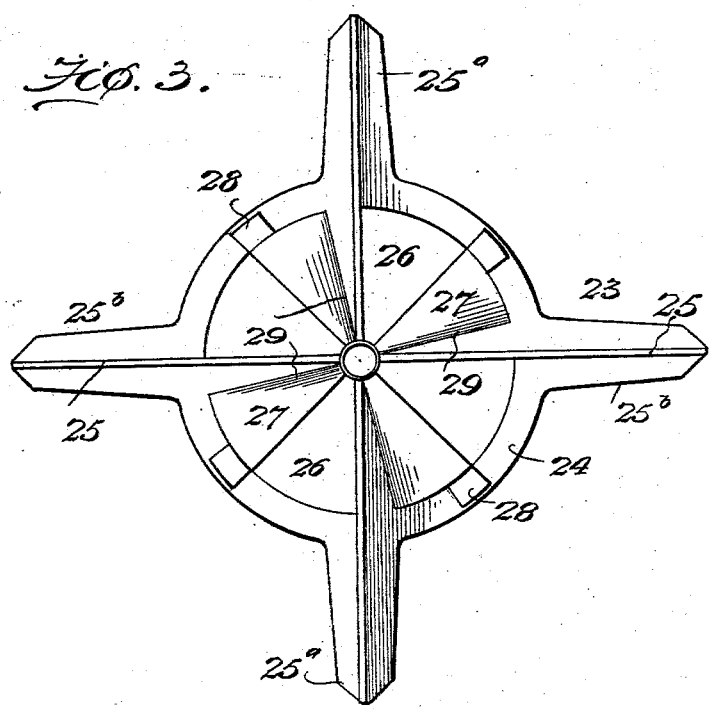
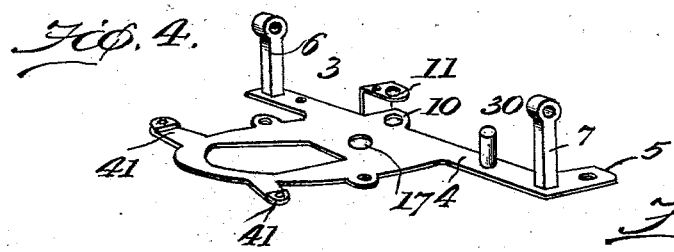
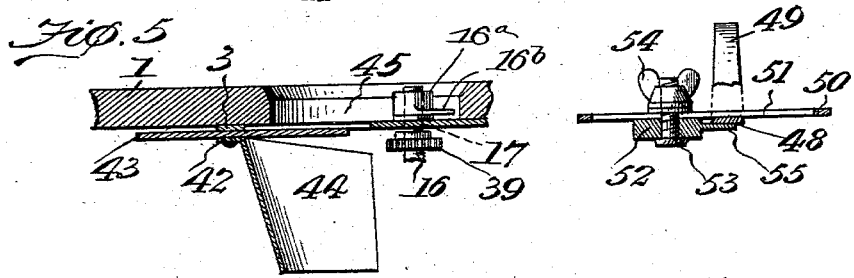
Witnesses
Samuel B. Abbott.
Curzon G. Abbott.
James C. Abbott. Inventors
by C. A. Snow & Co.
Attorneys No. 758,231. Patented April 26, 1904.

UNITED STATES PATENT OFFICE.

SAMUEL BEMONT ABBOTT, OF GOSHEN, INDIANA, CURZON GEORGE ABBOTT, OF GRAYLING, MICHIGAN, AND JAMES CYRUS ABBOTT, OF GOSHEN, INDIANA.

BROADCAST SEED-PLANTER.

SPECIFICATION forming part of Letters Patent No. 758,231, dated April 26, 1904.

Application filed July 30, 1903. Serial No. 167,610. (No model.)

*To all whom it may concern:*

Be it known that we, SAMUEL BEMONT ABBOTT, residing at Goshen, in the county of Elkhart and State of Indiana, CURZON GEORGE ABBOTT, residing at Grayling, in the county of Crawford and State of Michigan, and JAMES CYRUS ABBOTT, of Goshen, in the county of Elkhart and State of Indiana, citizens of the United States, have invented a new and useful Broadcast Seed-Planter, of which the following is a specification.

This invention relates to broadcast seeders of that class in which two reversely-revolving distributing-wheels receiving the seed uniformly from the source of supply are employed to distribute the seed equally to both sides of the machine.

Our present invention has for its object to provide a machine of this class which shall possess superior advantages in point of simplicity, durability, and general efficiency; and with these ends in view the invention consists in the improved construction, arrangement, and combination of parts, which will be hereinafter fully described, and particularly pointed out in the claims.

In the accompanying drawings we have shown a simple and preferred form of embodiment of our invention; but we desire it to be understood that we do not necessarily limit ourselves to the precise structural details shown, but reserve to ourselves the right to any changes, alterations, and modifications that are within the scope of our invention and which may be resorted to without departing from the spirit or sacrificing any degree of the efficiency of the same.

In said drawings, Figure 1 is a side elevation of a device constructed in accordance with the principles of our invention. Fig. 2 is a bottom plan view of the same. Fig. 3 is a plan view of the upper seed-disk detached. Fig. 4 is a perspective detail view of the base-plate of the device detached. Fig. 5 is a detail sectional view taken on the line 5 5 in Fig. 2. Fig. 6 is a sectional detail view taken on the line 6 6 in Fig. 2.

Corresponding parts in the several figures are indicated by similar numerals of reference.

1 designates the bottom of a flexible grain-receptacle 2, which may consist of a canvas sack of suitable dimensions open at its upper end and connected at its lower likewise open end with the edge of the bottom piece 1 by means of tacks or other suitable connecting means. The bottom piece 1 is preferably rectangular in shape, or approximately so, although we desire it to be understood that any suitable change in the shape of the same is within the scope of our invention.

Suitably secured to the under side of the bottom piece 1 is a flat plate or casting which may be described as comprising an approximately segmental body 3, having an obliquely-disposed bar 4, which is provided with an outwardly-extending arm 5. The bar 4 is provided at opposite ends thereof with posts 6 and 7, which extend downwardly and which afford bearings for a shaft 8, having at one end a crank 9, which latter extends beyond the confines of the bottom board 1, so that it may be conveniently rotated by the operator. The obliquely-disposed bar 4 is also provided with a lateral extension 10, upon which is mounted a bracket 11, affording bearings for a short vertical shaft 34, to be hereinafter referred to. It is to be understood that the plate or casting comprising the parts or members 3, 4, 5, 6, and 7 is to be considered in the nature of a hanger or supporting device by means of which all the working parts of our improved seeder are supported below or suspended from the under side of the bottom piece 1.

Heretofore in broadcast seeders of the class to which our invention belongs—that is, the class in which horizontal or approximately horizontally disposed seed-disks or distributing-fans are employed—it has been customary and necessary to employ what has been termed a "spider-frame" to support all the operating mechanism which is disposed below the bottom board. By this invention the spider-frame is dispensed with, with the exception of a very light structure, which will be hereinafter described and which is used not for supporting but merely for steadying the main post or axis of the device. This spider or frame, which in the accompanying drawings has been designated 14, extends downwardly from one of a pair of segmental brackets 12 and 13, which are mounted upon the under side of the bottom board 1. The bracket 12, from which said spider extends, is the inner one. The outer bracket 13 is curved, as shown, to correspond with the curvature of the end of the bottom board of the device, which may thus when in operation be supported against the body of the operator. The spider 14 is to be constructed of wire or other suitable material, and it is provided with an eye 15, forming a bearing for the lower end of a vertically-disposed shaft 16, the upper end of which is suitably journaled in a bearing 17, formed for its reception in the base-plate 3. At its upper end, which extends into the seed-compartment, the shaft 16 carries a hub $16^a$, provided with a radiating arm $16^b$, which latter serves as an agitator to enable the seed to escape through the seed-opening, which is to be hereinafter more fully described. The hub $16^a$, which is firmly secured upon the upper end of the shaft 16, serves to suspend the latter, which in turn supports other important parts of the operating mechanism from the plate or casting, which has been described as constituting a hanger by means of which the operative parts of the device are suspended under the bottom board of the device.

Suitably mounted upon the shaft 16 near its lower end is a hub 18, carrying the lower seed-disk 19, which may be described as consisting of a central disk 20, provided on its upper side with radially-extending ribs 21, all of which are formed integral with the central disk, which is shaped from a single piece of sheet metal by suitably crimping the same in such a manner as to form the said disk 20 and the radial ribs 21 integrally therewith. The ribs 21 are extended radially to form fingers $21^a$, which extend beyond the periphery of the disk, and we desire it to be specially noted that the ribs 21 $21^a$ are of greater height at their outer ends than at their inner ends, this being accomplished by properly crimping the said disks, which thereby in addition to making the ribs of increasing height in an outward direction are also given the proper and necessary central dish or concavity. It will also be noticed that the extensions $21^a$ of said ribs are provided with laterally-extending flanges $21^d$, which form outward extensions of the disk 20 proper.

Independently revoluble upon the shaft 16 above the hub 18 is a hub or sleeve 22, supporting near its lower end an upper seed-disk 23, which being composed of a central disk 24, having radiating ribs 25, extends beyond the periphery of the disk to form fingers $25^a$, having laterally-extending flanges $25^b$, which are integral with and extend from the body of the disk. The latter, however, is provided between the ribs 25 with V-shaped slots 26, adjacent to which the body of the disk is upturned to form propeller-shaped blades 27, the outer edges of which have braces or supports 28, whereby they are connected with the rim of the seed-wheel. The inner or attached edges of the propeller-shaped blades 27 are connected with the adjacent ribs 25, thus forming pockets 29 for the reception of seed. It will be observed that the upper edges of the propeller-shaped blades 27 are extended above the upper edges of the adjacent ribs 25. The purpose of this special construction will be hereinafter fully described.

The oblique bar 4 of the base-casting is provided with a pin 30, upon which is journaled a toothed drive-wheel 31, the hub of which forms a bevel-pinion 32, which meshes with a bevel-gear 33, suitably mounted upon the shaft 8, to which reference has hereinbefore been made. The lug or post 11 upon the extension 10 of the bar 4, together with said extension, affords bearings for a short vertical shaft 34, carrying pinions 35 and 36, the upper smaller one of which, 35, which is adjacent to the base-plate, is in engagement with the toothed periphery of the drive-wheel 31. The larger pinion 36 meshes with a correspondingly-sized pinion 38 upon the sleeve or hub 22, carrying the upper seed-wheel, while the shaft 16 carries a pinion 39, equal in size to the pinion 35 and which like the latter meshes with the drive-gear 31.

It will be seen that when motion is imparted to the drive-gear 31 by means of the bevel-gear 33 upon the cranked shaft 8 the pinions 35 and 39 will be rotated in the same directions, the latter serving to rotate the shaft carrying the lower seed-wheel. At the same time the pinion 36 upon the shaft 34 will be rotated with said shaft and, meshing with the pinion 38 upon the sleeve 22, will serve to rotate the upper seed-wheel in a reverse direction to that of the lower one, the speed being governed by the relative sizes of the gears and by the rapidity with which the shaft 8 is rotated.

Suitably connected to the base-plate by means of bolts 40, which extend through the ears 41 upon the head 3 of said base-plate, is a cross-bar 42, which is suitably spaced from the base-plate by means of the interposed cut-off 43, the latter being free to move between the portion 3 of the base and the cross-bar 42. The latter is connected or formed integral with a flanged plate 44, constituting a seed-guide, the function of which is to prevent the wind from interfering with the seed dropping through the seed-opening 45, (see Fig. 5,) which extends through the bottom board 1 and the portion 3 of the base-frame and onto the seed-wheels. The seed-slide has an arm 46, which extends under the staple or guide 47 and is connected pivotally with a lever 48, having its fulcrum upon the arm 5, extending from the obliquely-disposed bar 4 of the base-frame. The lever 48 is provided with an upturned handle 49, by means of which it may be conveniently manipulated by the operator so as to cause the slide 43 to assume a position with relation to the seed-opening 45 which will permit just the desired quantity of seed to escape through the latter.

Suitably attached to the bottom board 1 and projecting beyond one edge thereof is a plate 50, having a slot 51, in which moves a slide or stop 52, capable of being secured in any position to which it may be adjusted by means of a bolt 53, having a winged nut 54. The slide 52 is provided with a laterally-extending lip 55, and the seed-slide-operating lever 48 is extended across the slotted plate 50 in the path of the slide 52. The latter, it will be seen, may be adjusted so as to limit the movement of the lever 48 in one direction—that is, the direction in which the seed-controlling slide is moved outwardly—to increase the size of the seed-opening. When the lever 48 is thus moved in the direction of the slide 52, it will engage between the lip 55 and the plate 50 and will thus be held frictionally from movement in the opposite direction. The plate 50 is preferably provided with gage-marks 56, which will indicate the proper position of the slide 52 to enable a certain quantity of seed to pass through the seed-opening in a given time. It is obvious that the position of the slide 52 will require different adjustment for various kinds of seeds; but this may be readily provided for, as will be easily understood.

Suitably secured to the under side of the bottom board 1 is a wire bail 57, carrying a handle 58, which may be grasped by the operator to assist him in steadying the machine when in operation. One of the arms 59 of said bail is provided with a shoulder or offset 60, whereby its inner portion is slightly spaced from the bottom board, and it will be seen that the operating-lever 48 extends through said space between the base-board and the arm 59 of the bail. A valuable guiding and supporting means is thus provided for the said seed-slide-actuating lever.

The operation and advantages of this invention will be readily understood from the foregoing description, taken in connection with the drawings hereto annexed. It will be seen that the quantity of seed permitted to drop from the receptacle 2 and through the seed-opening in the member 3 of the base-plate is capable of being minutely regulated by means of the slide 43, the construction and operation of which has been already described. This construction, which is of the simplest character possible, enables the slide to be guided and secured in the simplest and most positive manner, so that at no time will any excessive quantity of seed be permitted to escape through the seed-opening. From the latter the seed drops into the upper seed-disk 24, which latter, being provided with openings occupying practically one-half its surface, will permit one-half of the seed to drop upon the lower seed-disk. It will be remembered, however, that the seed-disks are rotated at a high rate of speed, and consequently a current of air will be set up by the upper disk which under ordinary circumstances would carry the seed along, hold it in suspension, and prevent it from dropping by gravity through the openings therein and onto the lower seed-disk. It will be noticed, however, that the propeller-shaped wings or blades 27 of the upper seed-disk have been shown and described as being extended above the upper edges of the adjacent ribs 25. It follows that a proper proportion of the seed escaping through the seed-opening will be deflected under the said propeller-shaped flanges and will thus be compelled to drop upon the lower seed-disk. The extent of the elevation of the edges of the propeller-flanges above the ribs may be varied by bending or otherwise adjusting said blades to accomplish the most satisfactory results. The seed-disks being rotated with the desired degree of rapidity in opposite directions, it is obvious that the seed placed thereon will be scattered in an outward direction by the centrifugal force evolved and also that, owing to the presence of two disks and to their rotation in opposite directions, the seed will be scattered far more conveniently and over a greater area than would be possible if a single seed-disk were used. At the same time we desire it to be understood that many improvements embodied in this invention are applicable and will be found extremely useful in devices of this class provided with a single seed-disk, and we reserve the right to use in such connection such of our present improvements as are capable of being thus applied. The seed-guide 44 is so disposed that the seed-dropping through the seed-opening and onto the seed-disks will be protected from wind coming from any direction, and the discharge of the seeding device will thus be even and accurate.

As has been hereinbefore set forth, the entire weight of the operating mechanism is suspended under the bottom of the seed-containing sack, the main shaft 16 being supported by means of the hub 16$^a$ at its upper end. This we consider an extremely-important feature of our invention. In devices of this class heretofore used a spider-frame has invariably been employed, especially for the purpose of supporting the main shaft, which latter has always had an obnoxious tendency to jump in its bearing, causing it and adjacent parts to operate with an uneven motion and to be quickly worn out. This disadvantage is prevented and overcome by our improvement, and it will be particularly noticed that the light spider 14 employed by us does not in any sense form a supporting device for the shaft 16, the lower end of which is engaged thereby, but that it is intended to serve merely to steady the lower end of said shaft, thereby rendering the operation of the entire device more steady, uniform, and satisfactory.

Having thus described our invention, we claim—

1. In a device of the class described including a pair of seed-disks, the upper seed-disk having radially-extending ribs, V-shaped slots adjacent to said ribs, and upturned, propeller-shaped blades.

2. In a device of the class described, an upper seed-disk having a plurality of openings and a plurality of inclined propeller-shaped blades, and intermediately-disposed radiating ribs connected with said blades and of increasing height in an outward direction.

3. In a device of the class described, an upper seed-disk having a dished body provided with alternate V-shaped openings and upwardly-inclined propeller-shaped blades, braces for said blades, and radiating ribs disposed intermediate the slots and the blades, the latter coacting with said ribs to form seed-pockets.

4. In a device of the class described, the combination with a bottom board, of a base-plate comprising a segmental portion having a seed-opening, an obliquely-disposed bar having posts at the ends thereof, and an arm and a lug extending laterally from said obliquely-disposed bar, said base-plate constituting the main frame of the operative parts of the device.

5. In a device of the class described, the combination of a base-plate, a bar spaced therefrom, a seed-slide movable between said base-plate and bar and having an arm, a lever pivotally connected with an arm of the base-plate, a pivotal connection between said lever and the arm of the seed-slide, a slotted plate across which the lever extends, and a slide movable and adjustable in the slot of said plate and having a laterally-extending rib adapted for frictional engagement with the seed-slide-operating lever.

6. In a device of the class described, the combination of a bottom board, a seed-slide, a seed-slide-operating lever, and a supporting-yoke having a handle, said supporting-yoke being provided with an arm extending under the bottom board and having a shoulder forming a guide for the seed-slide-operating lever.

7. In a device of the class described having oppositely-revoluble upper and lower seed-disks, an upper seed-disk provided with slots and with upturned propeller-shaped blades adjacent to said slots and braces at the outer ends of the propeller-shaped blades to maintain the latter at the proper elevation.

8. In a device of the class described, including a pair of seed-disks, an upper seed-disk having radially-extending ribs, slots adjacent to said ribs, and upturned, propeller-shaped blades with their free edges elevated above the adjacent ribs.

9. In a device of the class described, including a pair of oppositely-revoluble seed-disks, an upper seed-disk having radially-extending ribs, slots adjacent to said ribs, and deflecting means projecting above the upper edges of said ribs to deflect seed passing from the source of supply through the slots in said upper disk.

In testimony that we claim the foregoing as our own we have hereto affixed our signatures in the presence of two witnesses.

SAMUEL BEMONT ABBOTT.
CURZON GEORGE ABBOTT.
JAMES CYRUS ABBOTT.

Witnesses:
SHERMAN RUTAN,
B. F. DEAHL.